United States Patent
Estrada et al.

(10) Patent No.: US 9,509,858 B1
(45) Date of Patent: *Nov. 29, 2016

(54) CALLING CARD REPLENISHMENT SYSTEM

(71) Applicant: Krush Communications, LLC, Tampa, FL (US)

(72) Inventors: Richard Estrada, Brandon, FL (US); Thomas Quigley, Brandon, FL (US); Brian Rudolph, Brandon, FL (US)

(73) Assignee: Krush Communications, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,953

(22) Filed: Oct. 20, 2015

Related U.S. Application Data (63) Continuation of application No. 14/630,910, filed on Feb. 25, 2015, now abandoned, which is a continuation of application No. 13/622,420, filed on Sep. 19, 2012, now abandoned, which is a continuation-in-part of (Continued)

(51) Int. Cl.
H04M 15/00 (2006.01)
H04M 17/00 (2006.01)

(52) U.S. Cl.
CPC ......... H04M 17/208 (2013.01); H04M 17/10 (2013.01); H04M 17/206 (2013.01); H04M 17/307 (2013.01)

(58) Field of Classification Search
CPC .................... H04M 17/00; H04M 17/20
USPC ............ 379/114.16, 114.17, 114.2, 114.15, 379/114.28; 705/39, 64, 69
See application file for complete search history.

(56) References Cited

U.S. PATENT DOCUMENTS 6,873,690 B2   3/2005   Moon et al.
7,295,658 B2   11/2007  Moon et al.
(Continued)

FOREIGN PATENT DOCUMENTS

KR   10-2008-0025238 A   3/2008
KR   10-2008-0035124 A   4/2008

OTHER PUBLICATIONS

Translation of KR 10-2008-0025238 published on Mar. 20, 2008; Applicant: Cyberpass, Inc.

(Continued)

*Primary Examiner* — Yosef K Laekemariam
(74) *Attorney, Agent, or Firm* — Nilay J. Choksi; Smith & Hopen, P.A.

(57) ABSTRACT

A method and system of real-time replenishment and electronic confirmation of sale, such as a SMS text message, to a consumer responsive to purchase or referral of long distance calling minutes, including real-time replenishment of the customer's account, and seamless, pin-less use of the purchased long-distance from the user's chosen phone(s). A computer based server receives a phone number, monetary amount, and an indication of whether an increase or decrease to the balance is requested. Phone number is then compared with a stored list of registered phone numbers having a unique pin and a balance amount. The balance is increased or decreased by desired amount if comparison results in a match. If comparison does not result in a match a new pin is created associating the phone with the balance amount. A message is then sent containing an access number for use in pre-paid long distance calling.

14 Claims, 5 Drawing Sheets

Related U.S. Application Data application No. 12/702,342, filed on Feb. 9, 2010, now Pat. No. 8,295,805.

(60) Provisional application No. 61/248,965, filed on Oct. 6, 2009.

(56) References Cited

U.S. PATENT DOCUMENTS

| | | | | |
|---|---|---|---|---|
| 7,539,294 | B2 * | 5/2009 | Moon | H04M 15/00 379/114.15 |
| 7,578,439 | B2 | 8/2009 | Graves et al. | |
| 8,295,805 | B2 | 10/2012 | Estrada | |
| 2001/0007983 | A1 * | 7/2001 | Lee | G06Q 20/04 705/69 |
| 2002/0035539 | A1 * | 3/2002 | O'Connell | G06Q 20/02 705/39 |
| 2007/0054678 | A1 | 3/2007 | Doulton | |
| 2007/0179819 | A1 | 8/2007 | Bradley et al. | |
| 2007/0179974 | A1 | 8/2007 | Cai et al. | |
| 2007/0244752 | A1 | 10/2007 | Bayne | |
| 2008/0219421 | A1 | 9/2008 | Enriquez | |
| 2009/0202054 | A1 | 8/2009 | Wick | |
| 2009/0202055 | A1 | 8/2009 | Moon et al. | |
| 2010/0130238 | A1 | 5/2010 | Kupsh et al. | |
| 2010/0330956 | A1 | 12/2010 | Estrada | |
| 2011/0235792 | A1 | 9/2011 | Foster et al. | |
| 2012/0215604 | A1 | 8/2012 | Canetto | |

OTHER PUBLICATIONS

Translation of KR 10-2008-0035124 published on Apr. 23, 2008; Applicant: Cyberpass, Inc.

International Search Report and Written Opinion of PCT/US2013/059908 (filed on Sep. 16, 2013) with a mailing date of Dec. 18, 2013; Applicant: Krush Communications, LLC et al.

International Preliminary Report on Patentability for PCT.US2013-059908 (priority date of Sep. 19, 2012) with a mailing date of Mar. 24, 2015; Applicant: Krush Communication, LLC et al.

* cited by examiner

CALLING CARD REPLENISHMENT SYSTEM

CROSS REFERENCE TO RELATED APPLICATIONS

This application is a continuation of and claims priority to U.S. Nonprovisional patent application Ser. No. 14/630,910, entitled "Calling Card Replenishment System", filed Feb. 25, 2015, which is a continuation of and claims priority to U.S. Nonprovisional patent application Ser. No. 13/622,420, entitled "Calling Card Replenishment System", filed Sep. 19, 2012, which is a continuation-in-part of and claims priority to U.S. Nonprovisional patent application Ser. No. 12/702,342, entitled, "Real-Time Replenishment with Electronic Confirmation of Sale of Prepaid Long Distance", filed Feb. 9, 2010, now U.S. Pat. No. 8,295,805, which claims priority to U.S. Provisional Patent Application No. 61/248,965, entitled "Electronic Receipts and Real-Time Replenishment for Prepaid Long Distance Calling", filed Oct. 6, 2009, all of which are incorporated herein by reference in their entireties.

BACKGROUND OF THE INVENTION

1. Field of the Invention

The invention relates to real-time replenishment of prepaid long distance accounts with electronic confirmation sent in response to a purchase or a referral of prepaid long distance calling.

2. Brief Description of the Related Art

Calling cards were first invented in the mid 1970's in Europe as a way to pay for phone calls upfront, thus allowing calls to be made from phone booths without using loose change or cash money. A calling card is a pre-paid card that allows a purchaser to purchase phone call minutes upfront and later redeem those minutes for use at a later time. Calling cards were first only available for making local calls. During the 1980's calling cards expanded in the United States to make international phone calls. International calling cards enable a buyer to purchase a card with usage rates, which are country specific.

Traditional calling cards are similar to a credit card. They contain a magnetic strip which encoded the balance available on the calling card. Users would "swipe" the magnetic cards just like is commonly done with a credit or debit card purchase. In 1990 New York's Regional Bell Operating Company created the first non-magnetic based calling card in the United States. With non-magnetic based calling cards a user receives a "PIN", Personal Identification Number, as a means for identification. In order to make calls a user dials in an 800 number and enters his PIN to make long distance phone calls. This process revolutionized the phone card industry and helped catapult it into the large force it is today.

Despite the advantages associated with non-magnetic based calling cards, there are several disadvantages that persist. First, text on the cards can be difficult to read and may wear off after constant contact with materials in a confined environment, such as a wallet or pocket. A user may no longer be able to access their calling minutes if they cannot read the appropriate telephone number and PIN information. Second, the process can be inconvenient for users to complete a call and add additional funds to an existing account. Specifically, users have to go through a lengthy process of dialing an 800 number, inputting a PIN number on the card, and then get transferred to the number they wish to contact. Finally, use of a physical card can be expensive to produce, create inventory problems and increase shipping costs for distributors and retailers. In an effort to overcome some of these disadvantages some retailers have resorted to printing the required information on a receipt obtained from a retail store.

Receipts have some advantages over use of cards such as cutting down on production and shipping costs. Retailers also have less inventory management that could potentially clog up space needed for sale of other products. Yet, the receipt method still has some of the same disadvantages as the card. Users still have to worry about being unable to access their accounts without the 800 number and PIN. In fact, users may "wear out" or lose track of the receipt easier than they would with a card. Once this information is lost the user will not be able to recover their account. Additionally, users still have to go through a prolonged process of entering PIN numbers whenever they want to make changes or use their account.

Currently, there are several methods that attempt to address some of the complications associated with PIN and 800 numbers. Specifically, U.S. Pub. No. 2009/0202055 to Moon et al., U.S. Pat. No. 7,295,658 to Moon et al., U.S. Pat. No. 7,539,294 to Moon et al., and U.S. Pat. No. 6,873,690 to Moon et al. While these methods provide solutions to problems associated with telecommunication issues occurring once a call is placed, they fail to address problems associated with confirmation of sale and replenishment concerns that existed in the prior art.

Presently, attempts to solve issues associated with confirmation of sale and replenishment concerns have failed to address some of the major issues. For example, U.S. Pub. No. 2009/0202054 to Wick attempts to alleviate some of the issues associated with card and receipt based confirmation of sale. Wick provides a method of automated distribution and indexing of prepaid calling card information comprising a central terminal operable to receive a request to purchase prepaid telephone services from an initiating terminal. A user may then decide to receive calling card information through a number of different messaging means. Calling card information contains a PIN number, access number, how much time has been purchased among other suitable information. While this method is a step in the right direction it falls flat on a number of important features that need to be addressed.

First, customers receive calling card information containing the traditional calling card information. This information still requires users to dial an access number, enter a PIN associated with the phone number and keep track of the PIN number to prevent loss of pre-paid long distance minutes. There exists a need for a receipt that enables a user to be able to use the access number without having to physically dial the access number and enter a PIN.

Second, this method provides a one-time transaction with a customer. Each time a user wishes to replenish their pre-paid minutes they will have to enter their contact information into a collection interface. Users will then receive a new receipt with a new PIN and access number associated with the latest transaction. Keeping track of the various receipts, PIN numbers and other information can become very tedious and time consuming for consumers. There exists a need for a replenishment method that allows repeat customers to be able to easily replenish their minutes without each transaction becoming a one-time interaction. Furthermore there exists a need for a method that moves away from the traditional PIN requirements and towards what are referred to in the industry as "PiNless" calling processes, like those discussed in the Moon patents.

Finally, this method lacks the ability to provide convenient incentive programs for existing consumers. Specifically, users who have already purchased pre-paid calling minutes should be able to receive incentives for referring new users. Additionally, new users should be able to receive an incentive bonus associated with participation in pre-paid calling. Such an incentive program is only possible through a method that recognizes the difference between repeat and new customers.

Technology has advanced since the time pre-paid calling cards were first used. Additionally, consumers are becoming more tech-savvy in operation of technical devices. One of the most recent advancements in technology is messaging through cellular devices. While the most popular method of messaging through cellular devices is SMS messaging, other methods, such as iMessage, e-mail, enhance messaging service (EMS) and multimedia messaging service (MMS), exist. There exists a need for a pre-paid long distance receipt of sale method that can utilize the technological advancements in the messaging field. Specifically, there exists a need for confirmation of sale and replenishment method that can be easily accessed from the message received. Additionally, there exists a need for a method in receipt and confirmation of sale for pre-paid long distance that eliminates the tedious and unneeded steps found in prior art. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a more efficient calling card replenishment system is now met by a new, useful, and nonobvious invention.

The present invention allows a customer to purchase long distance calling minutes without the need to physically take a calling card with the person to deem the minutes. The present invention includes a method and system of providing an electronic receipt to a consumer responsive to a purchase of long distance calling minutes, real-time replenishment of the customer's account, and seamless, PINless use of the purchased long-distance from the user's chosen phone(s).

In an embodiment, the method of real-time replenishment with electronic confirmation in the sale of prepaid long distance includes receiving a phone number, a monetary amount, and an indication of whether the user would like to add funds to their balance or receive a refund. The phone number is compared to a stored list of registered phone numbers. Each of the registered phone numbers in the list has a unique PIN assigned to it. A customer's balance amount is also associated with the unique PIN and the registered phone number. If the comparison found no matching registered numbers in the stored list and if the customer indicated that he would like to add funds to his balance, then a new PIN is created (and associated with the phone number). If the customer indicated that he would like to add funds to his balance, then the balance amount for the account associated with phone number is increased by the monetary amount. If the customer indicated that he would like a refund, then the balance amount for the account associated with the phone number is decreased by the monetary amount. Then, a request having the phone number and a message to be sent to the phone number is sent to a server. The message sent to the phone number may include the access phone number, the monetary amount that was added or refunded, and/or the balance amount.

A customer may dial the access number contained within the message by pressing or selecting a specified link relating to the access number. This prevents the customer from having to go through the arduous task of having to dial the access number while referring back to the receipt.

If the comparison found no matching registered numbers in the stored list and the customer indicated that he would like a refund then the method may further include indicating an error message, which may be displayed to the customer. If the customer requests a refund and the refund results in the account balance being less than one cent, then the method may further include destroying the unique PIN associated with the phone number.

In an embodiment, the system of real-time replenishment with electronic confirmation in the sale of prepaid long distance includes a web portal operable to perform the method described above. The system may further include a server operable to receive the request from the web portal having the phone number and a message to be sent to the phone number, parse the request into a SMS text message comprising the phone number and a message to be sent to the phone number, and send the SMS text message to the mobile phone associated with the phone number.

In an additional embodiment, the method of real-time replenishment with electronic confirmation in the sale of prepaid long distance includes receiving a message having a PIN. The message will be associated with the phone number from which the message was sent. The method further includes determining if the PIN is valid, retrieving a monetary amount associated with the PIN, responsive to a determination that the PIN is valid, associating the monetary amount with the phone number, and sending a message to the phone number. Message may contain an access number, account balance and amount added. If it is determined that the PIN is not valid, then the method may further include sending a message indicating that the PIN is invalid.

Finally, this invention provides a method of real-time replenishment with electronic confirmation in the referral of prepaid long distance calling. The method includes receiving a phone number and a referral phone number to a computer based server. The referred phone number is compared to a stored list of registered phone numbers. Each of the registered phone numbers in the list has a unique PIN assigned to it. A customer's balance amount is also associated with the unique PIN and registered phone number. If the comparison of the referral phone number to the list of registered phone numbers did not result in a match, a unique PIN is created (and associated with the phone number). Then, a request having the referral phone number and a message to be sent to the referral phone number is sent to a server. The message may include the access phone number, the monetary amount added as an incentive for the referral and a balance amount.

The phone number responsible for sending the referral phone number may also receive an incentive. This is dependent upon a comparison of the phone number with the list of registered phone numbers. If the comparison results in a match a request having the phone number and a message to be sent to the phone number is sent to a server. The message may include the access phone number, the monetary amount added as an incentive for referral and a balance amount of the customer's account.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes a method of real-time replenishment in the sale of prepaid long distance. After a transaction, including creation of a new account, adding funds to an existing account, or refunding all or a portion of an existing account, the customer's account will be updated in real-time, allowing the customer to use the minutes just after purchasing them.

Figure 1:
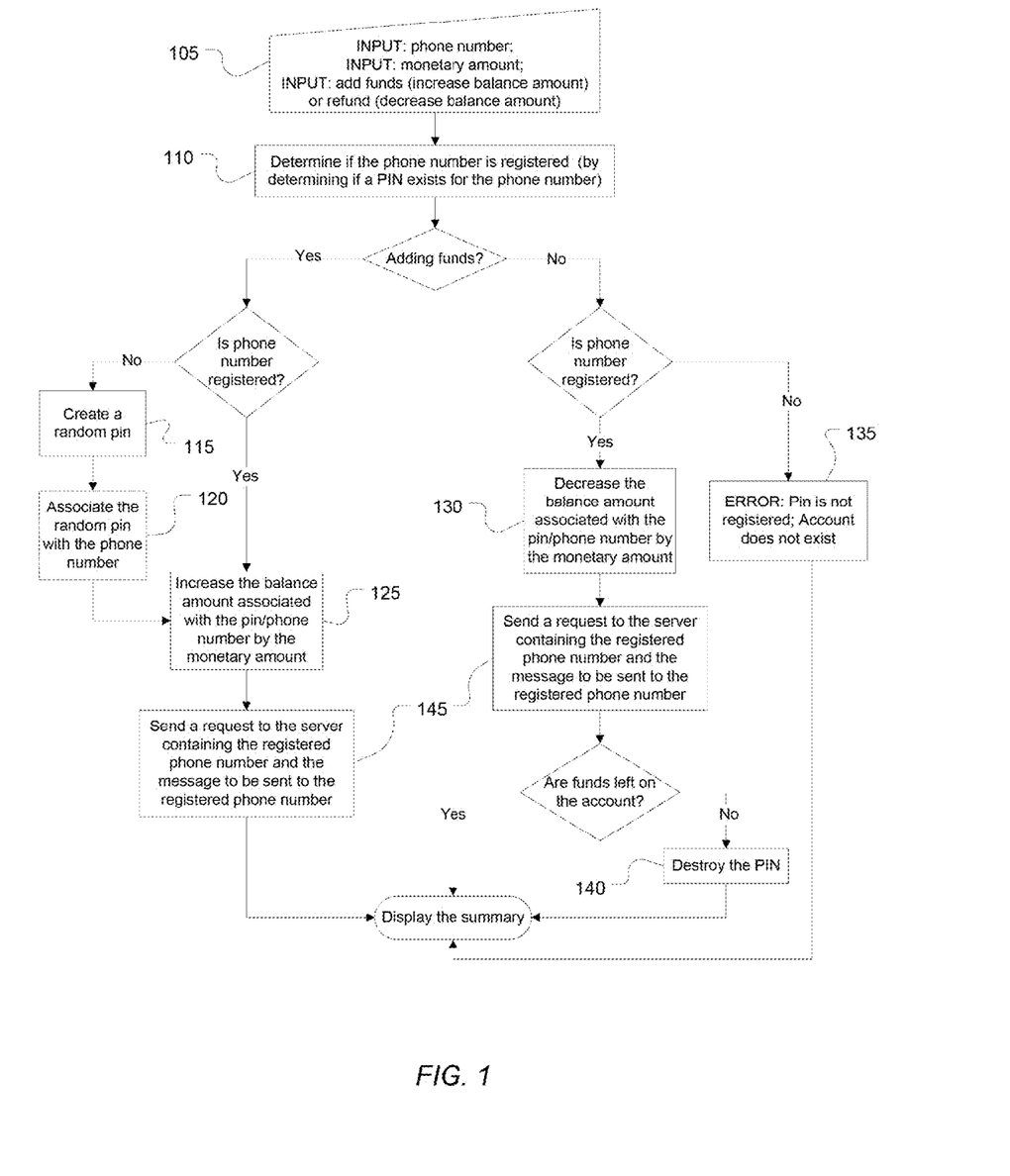
FIG. 1 is a flowchart of the method of real-time replenishment with electronic confirmation in the sale of prepaid long distance in accordance with an embodiment of the present in invention.

The method, which is illustrated in the flowchart of FIG. 1, includes receiving a phone number, a monetary amount, and an indication of whether the customer would like to add funds to their balance or receive a refund to a computer based server (operation 105). The phone number is compared to a stored list of registered phone numbers (operation 110). Each of the registered phone numbers in the list has a unique PIN assigned to it. The customer's balance amount is also associated with the unique PIN and the registered phone number. If the comparison found no matching registered numbers in the stored list and if the customer indicated that he would like to add funds to his balance, then a new PIN is created (operation 115) (and associated with the phone number (operation 120)). If the customer indicated that he would like to add funds to his balance, then the balance amount for the account associated with phone number is increased by the monetary amount (operation 125). If the customer indicated that he would like a refund, then the balance amount for the account associated with the phone number is decreased by the monetary amount (operation 130). One of the key features of this invention is that the customer does not have to enter a PIN to access their account. Instead, the information is stored on a computer based server so that the customer can simply indicate whether they wish to increase or decrease their account from their mobile device with no need to memorize numbers.

If the comparison found no matching registered numbers in the stored list and the customer indicated that he would like a refund, then an error is indicated, and may be displayed to the customer (operation 135). If the customer requests a refund and the refund results in the account balance being less than a predetermined amount, for example one cent, then the unique PIN associated with the phone number is destroyed (operation 140).

In an alternative embodiment a consumer may add funds to an existing account or establish a new account by including a pre-purchased PIN number in the information sent to the computer based server. A pre-purchased PIN may be any PIN associated with a company's services offered through traditional means, i.e., traditional calling cards and receipts bought in retail stores. The process for this embodiment is much the same as the method illustrated in FIG. 1 with the addition of receiving a pre-purchased PIN. Once the pre-purchased PIN is received the server will determine whether the pre-purchased PIN is valid. If the pre-purchased PIN is valid the monetary amount associated with the receipt will be added to the customer's account. If the PIN is invalid no money will be added and a customer may receive a notification indicating the invalidity.

Figure 2:
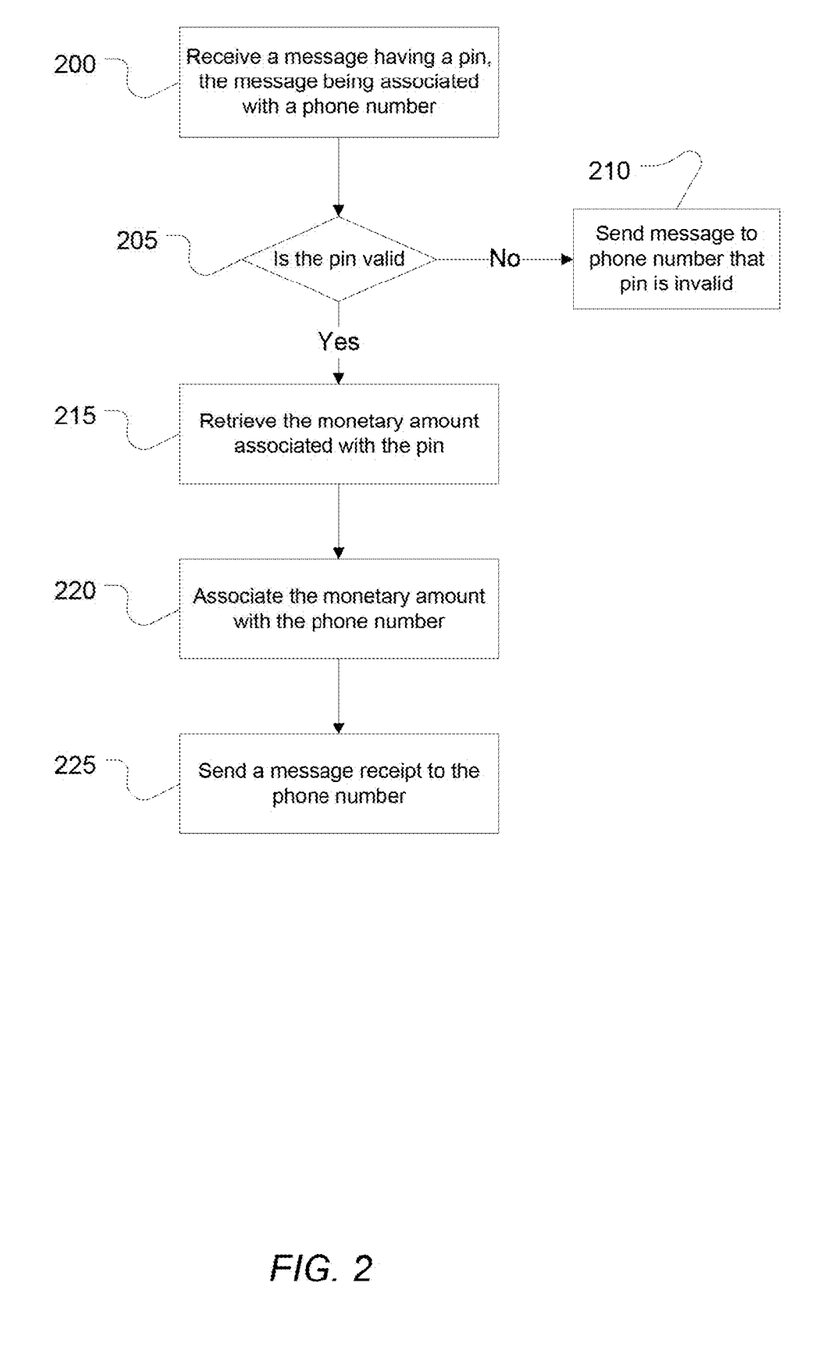
FIG. 2 is an exemplary block diagram of the functional interaction of the components used to provide SMS text receipts to cellular devices in accordance with an embodiment of the present in invention.

This embodiment is best illustrated in FIG. 2. A customer may purchase prepaid long distance services and receive a PIN. The PIN may be a series of letters or numbers or a combination thereof. For example, PIN may also be in the form of a promotional code. The customer then uses the phone that he/she wishes to register with the prepaid long distance service to send a message containing the pin to a number designated by the prepaid long distance service provider. Upon receipt of the message (operation 200), the PIN is validated (operation 205) to ensure that the PIN exists and has a monetary value associated with it (i.e. the PIN has been paid for). If the PIN is invalid, a message is sent to the customer's phone number notifying the customer of the PIN's invalidity (operation 210). If the PIN is valid, the monetary amount associated with the PIN is retrieved (operation 215) and associated with the phone number (operation 220). A text receipt is then sent to the phone number (operation 225).

The present invention also includes a method of providing a consumer with an electronic receipt of the customer's transaction when they purchase or recharge prepaid long distance. Electronic receipts are a feature added to a website that provides the ability to send a virtual receipt of the customer's transaction.

An electronic message, such as a SMS text message, iMessage, email, or other messaging type is sent to a customer's mobile device to verify completion of transaction after a purchase or recharge of the prepaid long distance service. The electronic receipt contains detailed information on the amount the customer purchased or recharged and the access number for use of the service. This electronic receipt may be in one or more languages. The consumer may opt-out of receiving the electronic receipt or specify preferences in how to receive the electronic receipt. One of the key distinctions of the present invention is that a customer does not have to receive a PIN in the receipt because the PIN number is stored on a server and is associated with the customer's phone number. Another advantage associated with this method is that a customer receives a linked access number in the message. This allows a customer to dial the access number contained within the message by pressing or selecting the specified link relating to the access number. This prevents the customer from having to go through the tedious task of having to dial the access number while referring back to the receipt.

In an implementation of the invention, a retail store takes and processes payment for the consumer. The retail store, in turn, sends payment to the provider of the prepaid long distance service. In another implementation, the website provides payment processing and the end user can order prepaid distance services directly using the website or a point of sale terminal, such as a kiosk located inside a retail store.

In an embodiment, the electronic receipts are SMS text messages that are requested by a web portal. The web portal is used by the consumer or another user, such as a convenience store clerk, to order long distance minutes or request a refund. An example of the functional interaction of the components used to provide SMS text receipts is shown in the block diagram of FIG. 3. In this example, website 310 builds a message that the user of registered device 335 will read upon receiving the text message. Website 310 then calls an API method defined under Nitrogen Web Services Framework 315 to send the text message (operation 145 of FIG. 1). The Nitrogen API method is written in PHP and builds HTTP request 317 that is sent to a server hosting SMS gateway service 320. HTTP request 317 includes the text to be displayed, the phone number to send the text message to, and an Internet Protocol (IP) Address of the server where SMS gateway service 320 runs. SMS gateway service 320 is provided by an open source Kannel software package. SMS gateway service 320 is the link between SMS mobile providers and the Content Provider (the server in which SMS gateway service 120 runs). SMS gateway service 320 handles connections with SMS mobile providers and relays them onward in a unified form. Once SMS gateway service 320 receives HTTP request 317 from the Nitrogen API method, it parses the request and sends the information to GSM Network 325 for SMS text message delivery through mobile network 330 to registered device 325. It is noted that there other known methods and processes that can be used to send and receive SMS messages to and from mobile devices that may be utilized.

Figure 3:
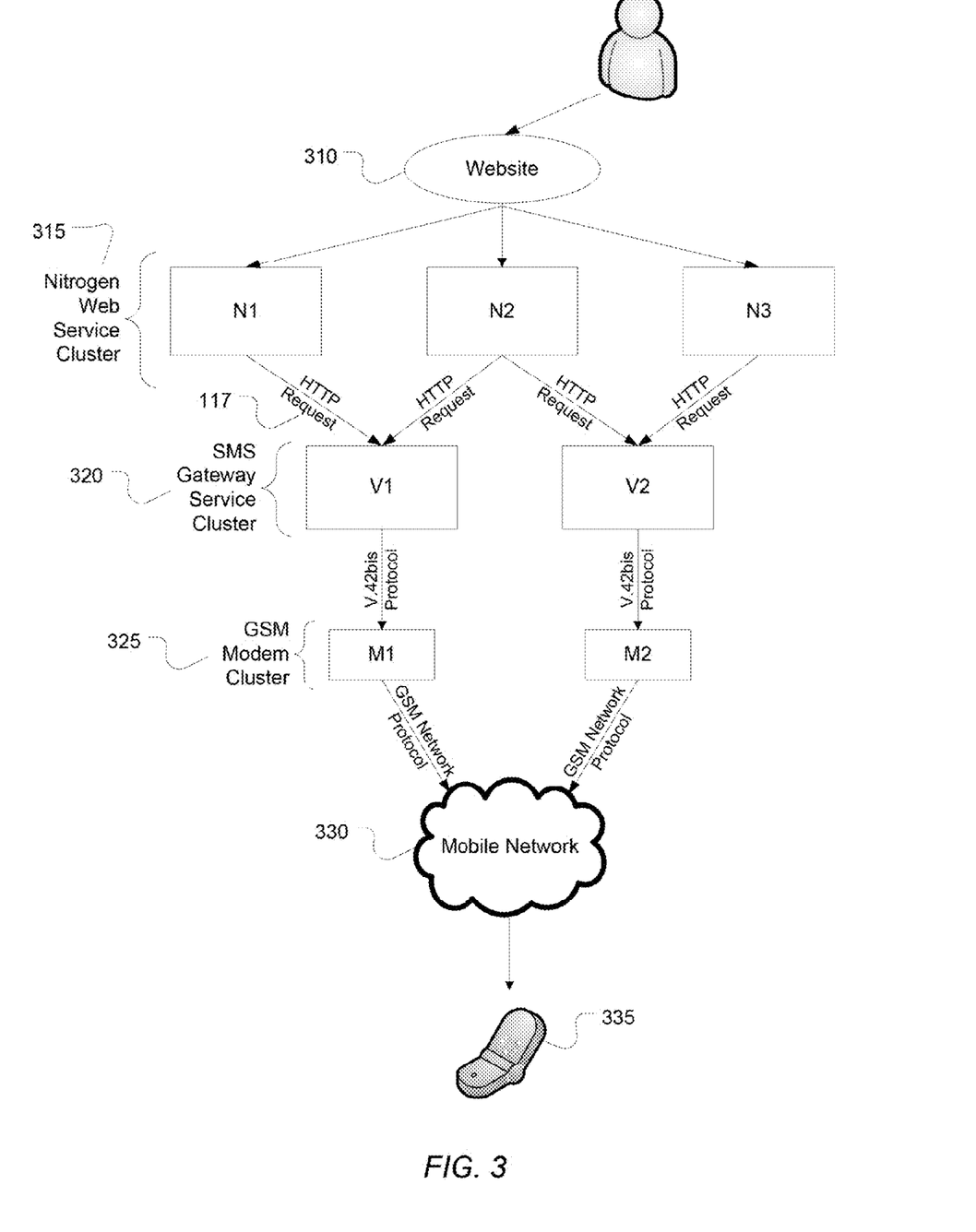
FIG. 3 is a flowchart of another method of real-time replenishment with electronic confirmation in the sale of prepaid long distance in accordance with an embodiment of the present in invention.

The electronic receipt sent to the registered device may include any information pertinent to the transaction, including the monetary amount that was added to an account, the current balance of an account, and the access numbers that the customer must dial to use the service. Each electronic receipt may include the text in one or more languages.

Figure 4:
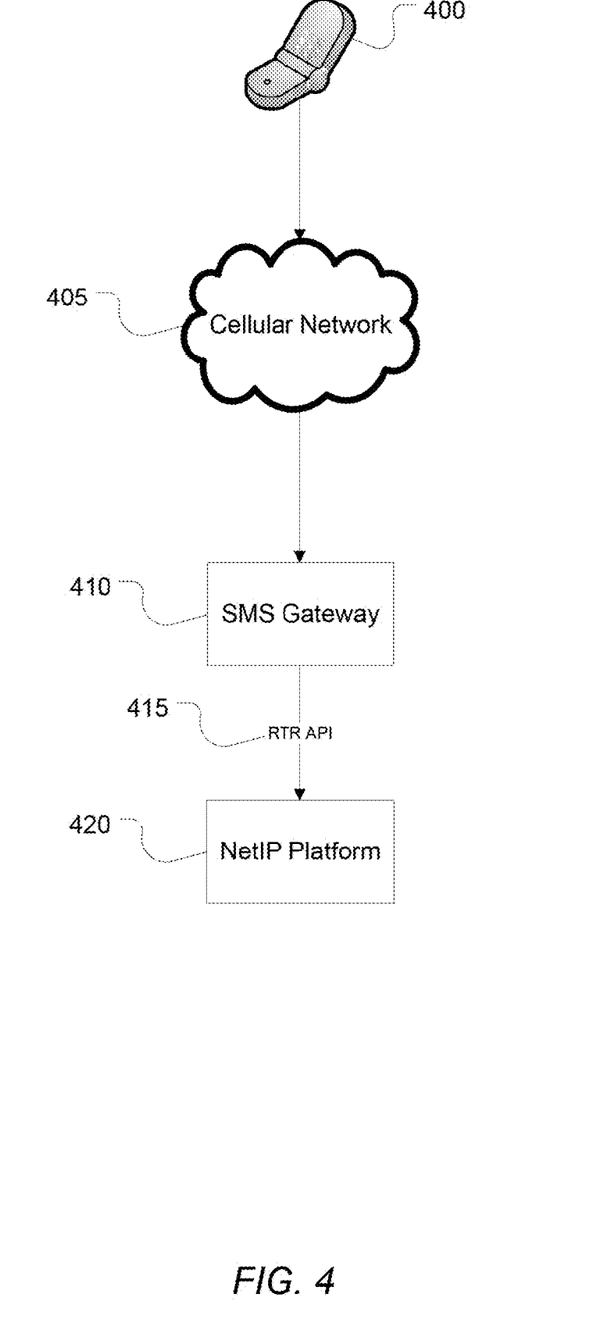
FIG. 4 is an exemplary block diagram of the functional interaction of the components used to receive and process a PIN from a customer and issue a SMS text receipt in accordance with an embodiment of the present in invention.

FIG. 4 shows an example of the functional interaction of the components used to receive and process a PIN from a customer and issue a SMS text receipt. In this example, a customer uses phone 400 to text a PIN to a designated phone number. The text message travels through cellular network 405 and is received at SMS Gateway 410. Real-time replenishment (RTR) API 415 determines the validity of the PIN and the monetary amount associated with the PIN, if any. RTR API 415 then communicates with NetIP Platform 420 and loads the user's phone number and the monetary amount. RTR API 415 then communicates with the SMS Gateway 410 to send a text receipt to the customer.

Figure 5:
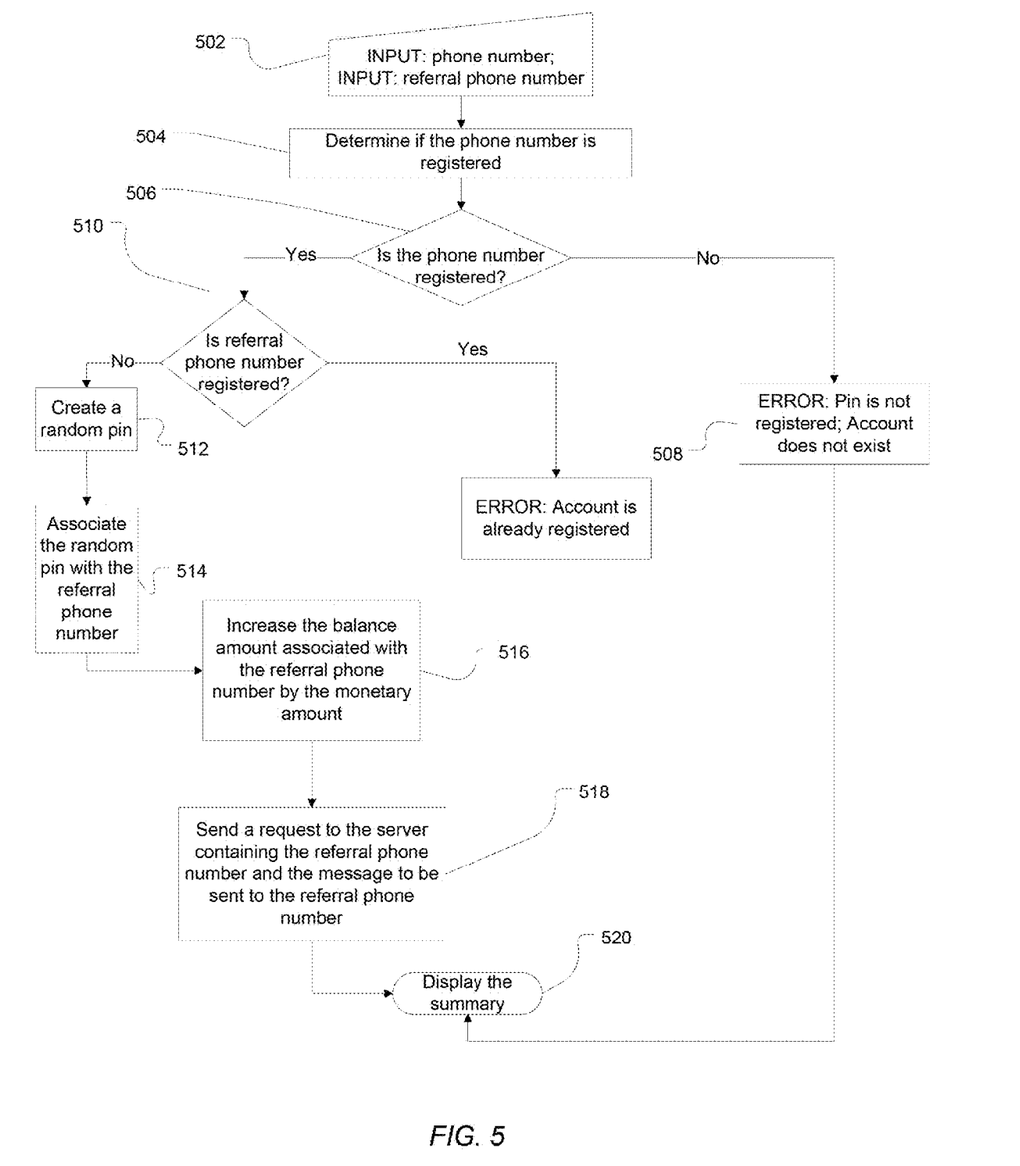
FIG. 5 is a flowchart of the method of receiving incentives for referrals in the sale of pre-paid long distance in accordance with a preferred embodiment of the present invention.

The present invention also includes a method of providing customers and referrals from the customers with incentives. Incentives are provided through an electronic receipt containing an access number. FIG. 5 illustrates a preferred embodiment of the steps for performing the method. The method includes receiving a phone number and a referral number to a computer based server (operation 502). Phone number is compared to a stored list of registered phone numbers (operation 504). Each of the registered phone numbers in the list has a unique PIN assigned to it and customer's balance amount. A determination is made whether the phone number is registered (operation 506). If the phone number is registered a determination is made whether the referral number is registered (operation 510). An error is indicated if the phone number is not registered (operation 508). To determine whether a referral phone number is registered it is compared to a stored list of registered phone numbers (510). In an alternative embodiment the method can involve going straight to determining whether the referral phone number is registered (operation 510). If the comparison found no matching registered numbers in the stored list, then a new PIN is created (operation 512) (and associated with the referral phone number (operation 514)). Once the account is created a pre-determined monetary amount is added to the referral phone number (operation 516). The pre-determined monetary amount can range depending on current marketing incentives. In an alternative embodiment the consumer who inputs the referral phone number may receive incentives.

An electronic message, such as a SMS text message, iMessage, email, or other messaging type is sent to the referral phone number's mobile device to verify completion of referral (operation 520). In addition, a message may be sent to the phone number that referred the referral number. The electronic receipt contains information on the amount the customer received and the access number for use of the service.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

GLOSSARY OF CLAIM TERMS

Access Phone Number: an access number is the number long distance calling consumers dial in order to access the system and use calling minutes or money associated with their account.

Account: refers to a personal business relationship established to provide for regular services, dealings and other financial transactions.

Computer based server: a computer hardware system dedicated to running one or more services. Services can vary from database server, file server, mail server, print server, web server, or various other types services achieved through a computer program.

Destroy: to permanently remove or delete.

Message: generally means an object of communication or vessel which provides information.

Monetary amount: an amount of material worth.

Phone number: string of numbers that associates a particular set of numbers with a particular phone or cell phone. The string of numbers can be used by someone to dial or reach another telephone, cell phone or other electronic device associated with the specific string of numbers dialed.

PIN: stands for personal identification number. Generally, a pin is a series of numbers and letters that are used to identify or associated with a specific entity or subject.

Pre-paid long distance calling: process of an individual exchanging money or payment upfront to make long distance phone calls in the future. Long distance phone calls can be local or international.

Pre-purchased: to acquire through purchase.

Registered phone number: a phone number in a stored list or record.

Referral: act of referring someone or something. To direct the attention of someone to something or someone.

SMS: stands for Short Message Service. It is the text communication component of phone, web, or mobile communications systems that allows users to send and receive short messages between fixed line or mobile devices. Currently, SMS text messaging is the most widely used data application in the world for mobile phone subscribers.

Web portal: a site on the World Wide Web that brings information from diverse sources in a unified way.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer-implemented method of real-time replenishment with electronic confirmation in the sale of prepaid long distance calling, comprising:

receiving a phone number to a computer based server, the phone number associated with a prepaid long distance calling account, the account having a monetary balance;

receiving a monetary amount to the server, wherein the monetary amount is a value by which the monetary balance is to be increased or decreased;

receiving to the server an indication of whether an increase or decrease to the monetary balance of the account is requested;

comparing the phone number to a stored list of registered phone numbers, each registered phone number having a unique pin and a balance amount;

creating a new pin, responsive to the comparison not resulting in a match and receiving the indication that an increase to the balance amount of the account has been requested;

responsive to the new pin being created, associating the new pin with the phone number, such that the new pin becomes the unique pin for the phone number;

increasing the balance amount of the account by the monetary amount, responsive to receiving the indication that an increase to the balance amount of the account has been requested;

decreasing the balance amount of the account by the monetary amount, responsive to receiving the indication that a decrease to the balance amount of the account has been requested;

indicating an error responsive to receiving the indication that a decrease to the balance has been requested and the comparison not resulting in a match;

transmitting from the server a request containing the phone number and a message to be sent to the phone number; and destroying the unique pin associated with the phone number responsive to receiving the indication that a decrease to the balance has been requested and the balance amount being less than a predetermined amount, said message containing an access phone number;

wherein said access phone number is for use in the prepaid long distance calling.

2. The method of claim 1, wherein:
the unique pin is the phone number.

3. The method of claim 1, wherein the message to be sent to the phone number further comprises the monetary amount.

4. The method of claim 1, wherein the message to be sent to the phone number further comprises the balance amount.

5. The method of claim 1, wherein the message to be sent to the phone number further comprises a link enabled access number for easy dialing of the access number.

6. The method of claim 1, further comprising:
receiving a pre-purchased pin to the server prior to the step of receiving a monetary amount to the server;
determining if the pre-purchased pin is valid;
retrieving an additional monetary amount associated with the pre-purchased pin, responsive to a determination the pre-purchased pin is valid;
associating the additional monetary amount with the phone number.

7. The method of claim 6, further comprising:
sending a SMS message indicating that the pre-purchased pin is invalid to the phone number responsive to a determination that the pre-purchased pin is invalid.

8. A system for real-time replenishment with electronic confirmation in the sale of prepaid long distance calling, comprising:
a web portal operable to:
receive a phone number to a computer based server, the phone number associated with a prepaid long distance calling account, the account having a monetary balance;

receive a monetary amount to the server, wherein the monetary amount is a value by which the monetary balance is to be increased or decreased;

receive to the server an indication of whether an increase or decrease to the monetary balance of the account is requested;

compare the phone number to a stored list of registered phone numbers, each registered phone number having a unique pin and a balance amount;

create a new pin, responsive to the comparison not resulting in a match and receiving the indication that an increase to the balance amount of the account has been requested;

responsive to the new pin being created, associate the new pin with the phone number, such that the new pin becomes the unique pin for the phone number;

increase the balance amount of the account by the monetary amount, responsive to receiving the indication that an increase to the balance amount of the account has been requested;

decrease the balance amount of the account by the monetary amount, responsive to receiving the indication that a decrease to the balance amount of the account has been requested;

indicate an error responsive to receiving the indication that a decrease to the balance has been requested and the comparison not resulting in a match;

transmit from the server a request containing the phone number and a message to be sent to the phone number; and destroying the unique pin associated with the phone number responsive to receiving the indication that a decrease to the balance has been requested and the balance amount being less than a predetermined amount, said message containing an access phone number;

wherein said access phone number is for use in the prepaid long distance calling.

9. The system of claim 8, wherein the server is operable to:
receive the request from the web portal comprising the phone number and a message to be sent to the phone number,
parse the request into a SMS text message comprising the phone number and the access number to be sent to the phone number, and
send the SMS text message to the mobile phone associated with the phone number.

10. The system of claim 8, wherein the server is operable to:
receive a pre-purchased pin to the server prior to the step of receiving a monetary amount to the server;
determine if the pre-purchased pin is valid;
retrieve an additional monetary amount associated with the pre-purchased pin, responsive to a determination the pre-purchased pin is valid;
associate the additional monetary amount with the phone number.

11. A method of providing incentives for referrals with electronic confirmation in the sale of prepaid long distance calling, comprising:

receiving a phone number associated with a prepaid long distance calling account, the account having a monetary balance;

receiving a referral phone number to the server;

comparing the referral phone number to a stored list of registered phone numbers, each registered phone number having a unique pin and a balance amount;

creating a new pin, responsive to the comparison not resulting in a match and receiving the indication that an increase to the balance amount has been requested;

responsive to the new pin being created, associate the new pin with the referral phone number, such that the new pin becomes the unique pin for the referral phone number;

sending a request through the server, the request containing the referral phone number and a message to be sent to the referral phone number; and destroying the unique pin associated with the phone number responsive to receiving the indication that a decrease to the balance has been requested and the balance amount being less than a predetermined amount, said message containing an access phone number and a monetary amount;

wherein said access phone number is for use in the prepaid long distance.

12. The method of claim 11, further comprising:

indicating an error responsive to the comparison of the phone number not resulting in a match.

13. The method of claim 11, further comprising:

comparing the phone number to a stored list of registered phone numbers, each registered phone number having a unique pin and a balance amount;

indicating an error responsive to the comparison of the phone number not resulting in a match;

sending a request through the server, the request containing the referral phone number and a message to be sent to the referral phone number;

said message containing an access phone number and a monetary amount;

wherein said access phone number is for use in the prepaid long distance calling.

14. The method of claim 11, wherein the monetary amount is the balance amount.

* * * * *